July 11, 1967 W. H. TSCHANTZ 3,330,318
FROZEN MEAT BLOCK CHIPPING APPARATUS
Filed Nov. 6, 1964 3 Sheets-Sheet 1
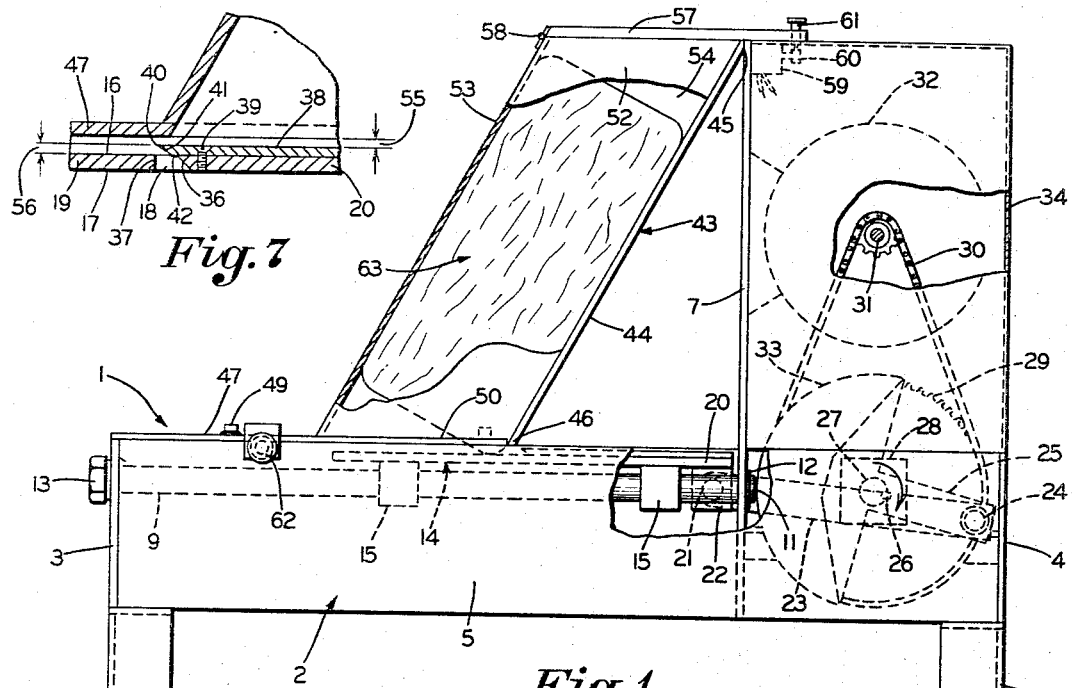
Fig. 7
Fig. 1
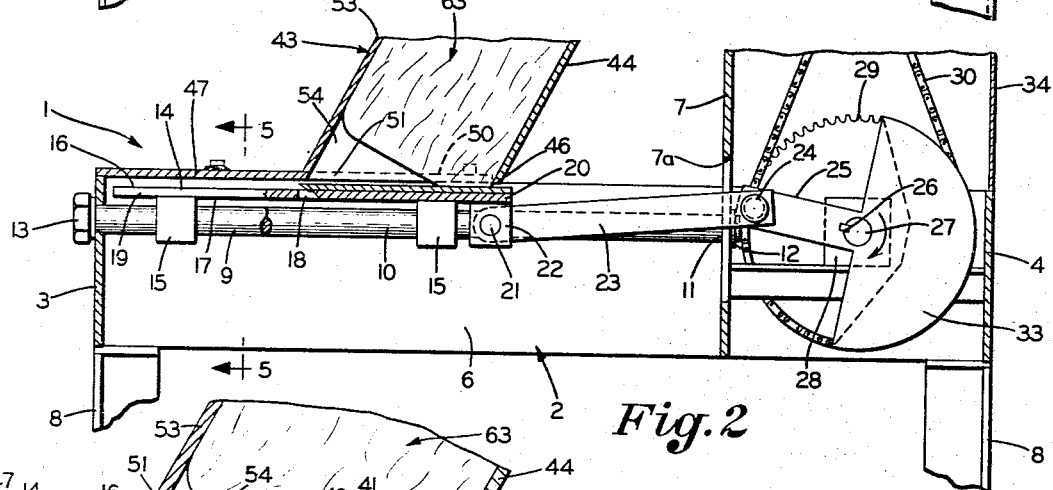
Fig. 2
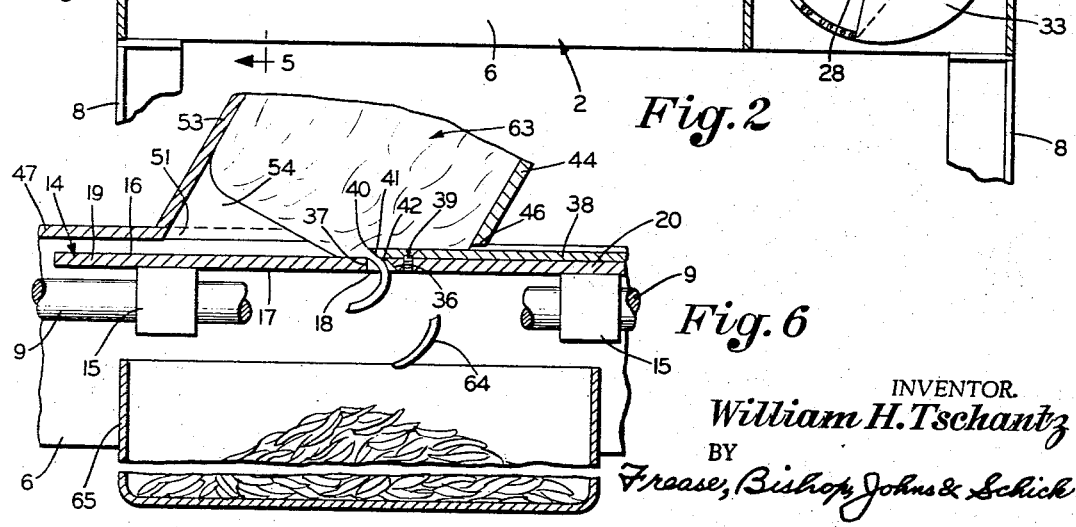
Fig. 6
INVENTOR.
William H. Tschantz
BY
Frease, Bishop, Johns & Schick
ATTORNEYS

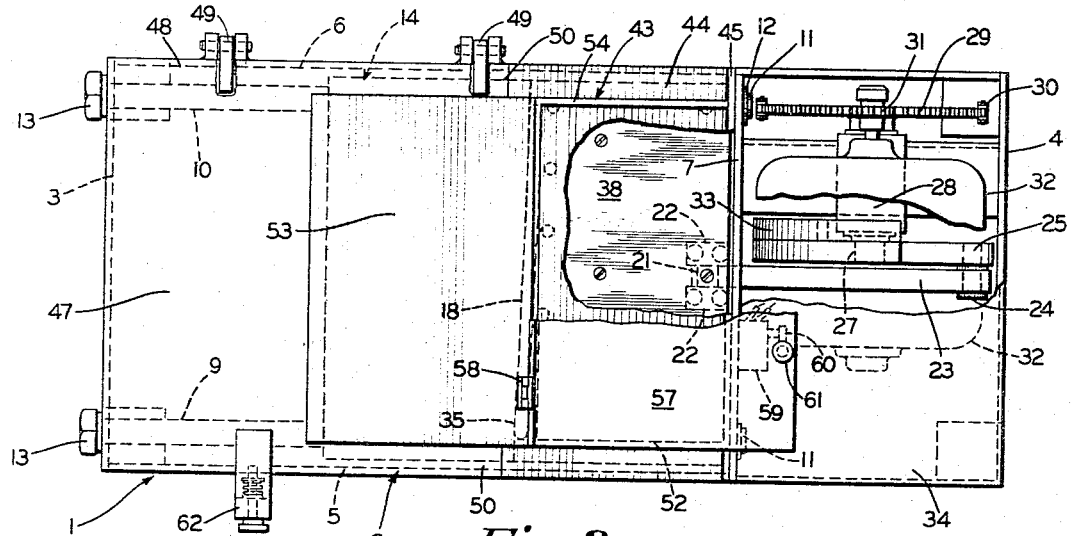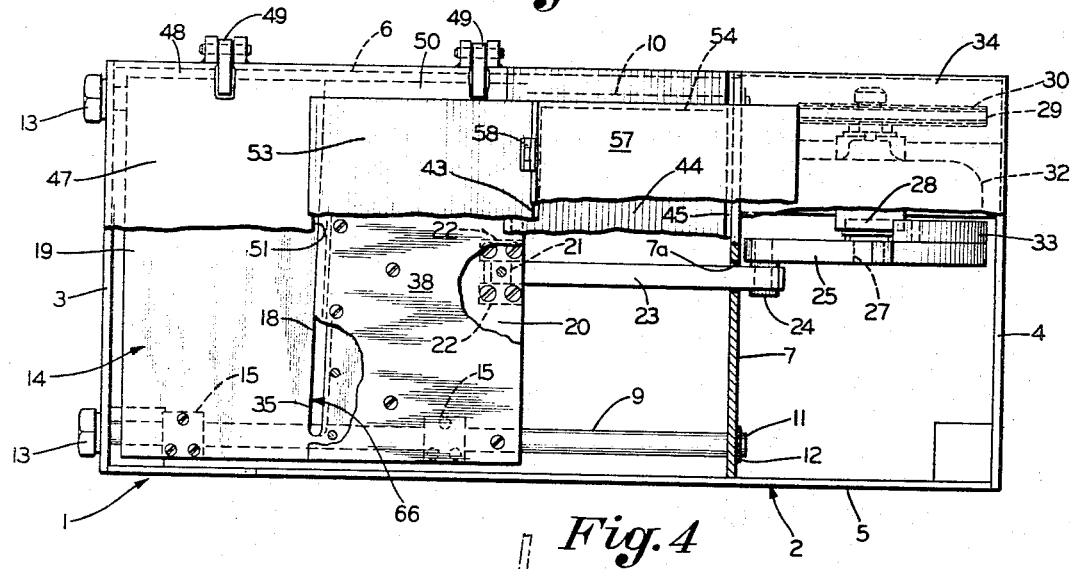

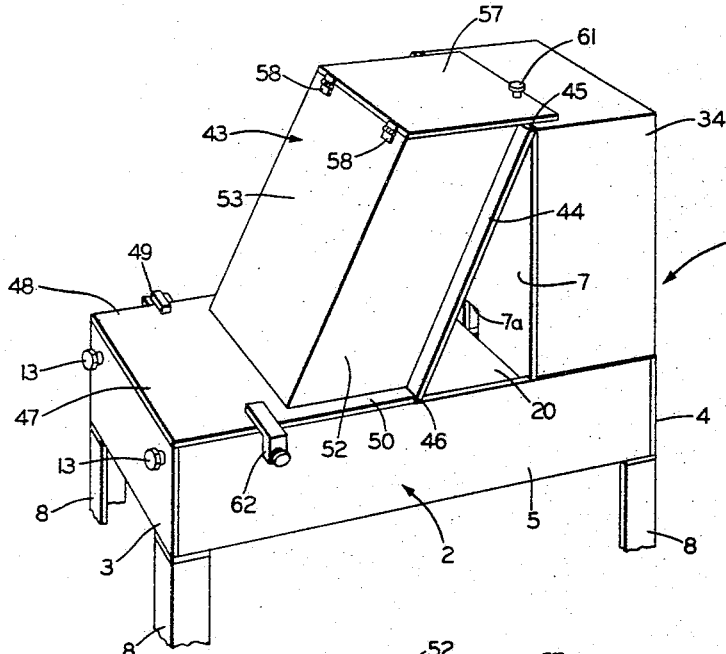
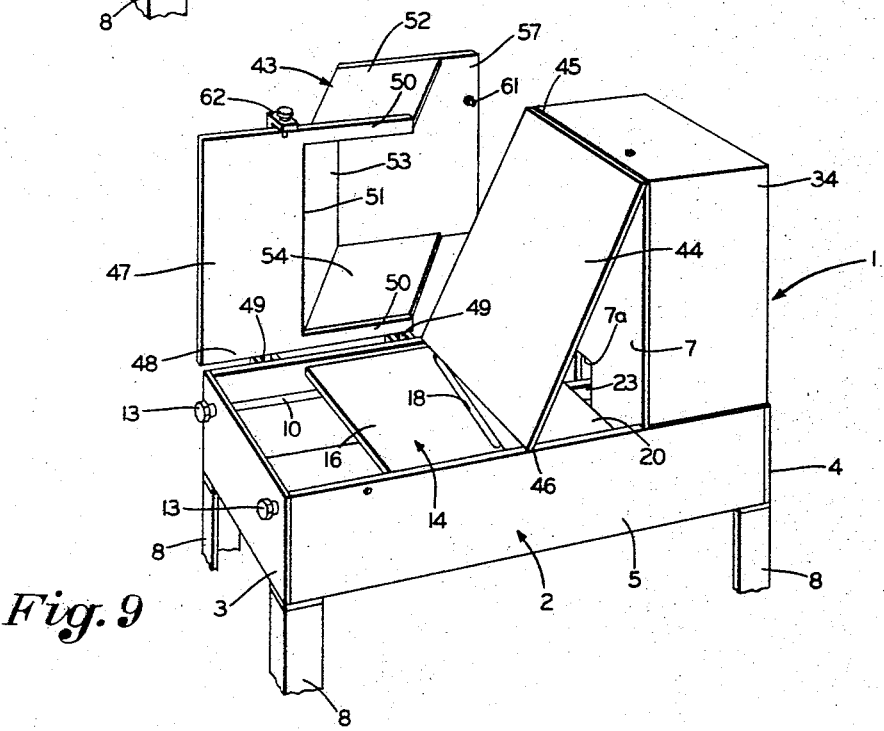

United States Patent Office 3,330,318
Patented July 11, 1967

3,330,318
FROZEN MEAT BLOCK CHIPPING APPARATUS
William H. Tschantz, R.D. 1, Kensington, Ohio 44677
Filed Nov. 6, 1964, Ser. No. 411,965
3 Claims. (Cl. 146—151)

The invention relates to the processing of frozen meat and more particularly to apparatus for chipping into frozen meat shavings, blocks of frozen meat without thawing, sawing or chopping the frozen blocks, and without meat or fluid loss from the block content, so that the frozen meat chips or shavings produced may be ground or otherwise processed in usual meat grinders to form ground meat rapidly and at minimum cost of conversion of the meat from frozen block to ground condition.

Meat in the past has been and now normally is processed in meat markets in refrigerated but unfrozen condition to convert the meat to the cuts or condition desired by the purchaser. Mechanized equipment such as saws, grinders, slicers, choppers, etc. have been designed in operation primarily to handle or prepare meat in unfrozen condition, although saws frequently are used to cut or prepare roasts, chops, steaks, etc. from frozen sides or sections of meat which normally include bones.

However, equipment and procedures for processing meat in unfrozen condition is inefficient and wasteful when used generally to process or prepare frozen meat. In many instances entirely new or different procedures and equipment are required for preparing frozen meat. Thus, any meat market whether large or small is faced with a problem where frozen and unfrozen meats both must be handled, prepared, or processed, as to how much equipment of different types can be justified economically for handling meat in both conditions.

In recent years beef in frozen block form, usually blocks, say, 4" x 12" x 16" to 7" x 15" x 21" has been imported from foreign countries and distributed to meat markets in frozen condition. The blocks are maintained frozen at the meat market until being prepared for retail sale as hamburger by the pound or packaged for supermarket counter display.

It is impractical to thaw such meat from the frozen block condition before grinding into hamburger, except for immediate sale of the entire thawed quantity, because the thawed meat will lose its bloom and have too short a case life for practical extended counter or case display or storage in bulk or in packaged ground condition. Further, some loss of fluid content accompanies thawing of meat from frozen block condition.

In order to delay the loss of bloom and to increase the case life of hamburger ground from beef in frozen block condition, the meat should be ground while being retained substantially in frozen condition.

These considerations in the past have dictated that beef in frozen block form when being converted to hamburger normally is sawed in the frozen state into small enough chunks, cubes, slices, fragments or sticks that such chunks, cubes, slices, fragments or sticks in frozen condition can be fed to and ground in usual meat grinders for conversion into hamburger.

This procedure involves several difficulties including considerable expense and waste. First of all, normally there is a loss of approximately 2 pounds of beef in the sawdust produced in sawing say a 60 pound frozen beef block into small enough portions to be ground in the usual grinder.

Next, the sawing operations are very time-consuming, thereby substantially increasing the time and labor cost factors in the cost of hamburger produced.

Next, wear and tear on grinding equipment is considerable due to the frozen condition of the relatively large chunks of frozen meat ground. If such chunks are sawed to be smaller in size to reduce the grinder load, then the losses in sawdust, time of sawing, etc. are increased.

This in effect requires the grinders to have a heavier, sturdier and more rugged construction where substantial amounts of meat in frozen block form are to be ground, thus increasing overall equipment costs.

Furthermore, the grinding of meat in usual grinders in frozen stick form is quite dangerous for the operator. This stick must be pushed forcefully into the grinder receiving hopper so that the lower frozen end is engaged by the grinding element. Frequently the grinding element grabs the frozen stick and whips it against the operator, injuring the operator.

These considerations indicate the ultimate existing problem of economic waste involved in the conversion of meat, primarily beef, from frozen block form to ground condition. This economic waste is considerable. It has been estimated by one chain of stores that the chain has a $2,000.00 per day conversion cost from meat loss and time, labor and equipment costs, in connection with the conversion of beef in frozen block condition to hamburger in condition to be packaged for counter display and sale.

Accordingly, it is a general object of the present invention to provide new apparatus and procedures for converting beef in frozen block form into frozen chips or shavings which can be directly ground into hamburger without loss of bloom, without decreasing case life, without meat loss, without substantial labor, and in substantially less time than heretofore has been required to convert frozen beef to hamburger in accordance with prior practice.

Also, it is an object of the present invention to provide new apparatus for chipping into chips or shavings of frozen meat, meat in frozen block form whereby the chips of shavings of frozen meat produced may be readily ground or otherwise processed in frozen condition in usual meat grinders without meat loss and in the same manner that unfrozen meat is ground in such meat grinders, without damage or unusual stress to the meat grinder, and without the hazard of injury to the operator that is present when frozen sticks are ground.

Moreover, it is an object of the present invention to provide new apparatus and procedures for converting meat from frozen block to ground condition rapidly and at minimum cost of conversion.

Also, it is an object of the present invention to provide new appartaus and procedures for converting meat from frozen block to ground condition which eliminates the time and expense of sawing, eliminates the loss of meat as sawdust produced by sawing operations, and eliminates the added load on, wear and tear on and special strength requirements for meat grinders arising when chunks of frozen meat are required to be ground.

Moreover, it is an object of the present invention to provide new apparatus for converting frozen meat from frozen block to ground condition which can handle frozen blocks of meat having a large range of block sizes.

Moreover, it is an object of the present invention to provide new meat chipping apparatus for chipping or shaving meat in frozen block condition which may be operated safely and which readily may be cleaned and maintained in a sanitary condition.

In addition, it is an object of the present invention to provide new appaartus and procedures for converting meat from frozen block to ground condition which in use results in a major reduction in conversion costs, thus essentially eliminating the economic waste problem heretofore existing.

Finally, it is an object of the present invention to pro vide new frozen meat block chipping apparatus and procedures which eliminate difficulties heretofore encountered in the art of handling and processing meat; which eliminate economic waste that in the past has characterized the conversion of meat from frozen to ground condition; which achieve the indicated objects in a simple, effective and low cost manner; and which solve problems and satisfy needs existing in the art.

These and other objects and advantages, apparent to those skilled in the art from the following description and claims, may be obtained, the stated results achieved, and the described difficulties overcome, by the apparatus, combinations, parts, elements, arrangements, relationships, constructions, methods, steps and procedures which comprise the present invention, the nature of which are set forth in the following statements, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the improved apparatus for chipping meat in frozen block condition may be stated in general terms as including a support frame open at its top and bottom, slide means mounted on the frame, a knife plate having top and bottom surfaces slidably mounted on the slide means, drive means including a motor and drive elements mounted on the frame and connected with the plate for reciprocating the plate on the slide means, the knife plate being formed with a chip slot extending in the plate generally laterally at an acute angle (slightly less than 90°) to the direction of plate travel during reciprocation and dividing the plate into front and rear sections, said angularly extending chip slot in part at least also preferably extending at an angle downwardly rearwardly between the top and bottom plate surfaces, blade means preferably removably mounted on the rear plate section having a knife edge located over and in alignment with said chip slot and formed by an edge beveled at an angle different from the downward rearward slot angle, said knife edge being spaced above the top surface of the front plate section a predetermined distance; feed hopper means carried by the frame formed with a feed opening adjacent the path of travel of the knife edge during reciprocation, the feed opening preferably being generally rectangular in shape having a lateral length approaching the lateral length of the chip slot and having a width in the direction of plate travel less than the distance traversed by said knife edge during reciprocation of the plate; the feed hopper means including a member movably preferably hinge-mounted on the support frame; the hinged member having a front cover portion, the front cover portion being normally positioned to cover that portion of the open top of the support frame along which the front section of the knife plate reciprocates, and to space the front cover portion above the knife plate and blade means mounted thereon; the hinged member also having U-shaped hopper forming walls extending upwardly rearwardly from the cover portion, the lower ends of said U-shaped walls defining three sides of said feed opening; the feed hopper means also including an upwardly rearwardly disposed hopper wall plate mounted on the support frame the lower end of which defines the fourth side of said feed opening; the hinged member when in normal position having its U-shaped walls located cooperatively with said upwardly rearwardly extending hopper plate to form a slanted frozen block-receiving hopper substantially rectangular in cross section extending upwardly rearwardly from said feed opening; said hinged member when swung on its hinged mounting out of normal position exposing the block contacting hopper surfaces and the slide plate and knife blade accessibly for cleaning; the slanted hopper forming U-shaped walls and hopper plate terminating in an upper open hopper end, a switch mounted adjacent said open hopper end, cover or lid means for said open hopper end, the cover means engaging said switch when the cover means is in closed position on the upper open hopper end, and the switch being connected in circuit with the motor to energize the motor only when the cover means is in closed position.

The nature of the improved method of converting meat from frozen block to ground condition may be stated in general terms as including the steps of angularly cutting slices from a frozen block of meat to form curled chips or shavings of frozen meat, then feeding the curled frozen chips in frozen condition to a grinder and grinding the same to form bloom retaining ground meat; and preferably carrying out the slice-cutting operation by slantingly positioning a frozen block of meat in a hopper in which the block slides downward by gravity to rest angularly against a reciprocable knife plate, positioning a knife blade on said knife plate with its blade edge extending at an acute angle to the direction of plate reciprocation, and reciprocating said plate, whereby the slantingly positioned frozen meat block and the angularly located blade edge cooperatively wedge-engage the blade and block to force the block downward in the hopper against the plate and to hold the blade edge engaged with the block during cutting movement of the knife plate.

By way of example, an embodiment of the improved chipping apparatus is shown in the accompanying drawings forming part hereof in which:

FIGURE 1 is a side elevation with parts broken away and in section of the improved chipping apparatus showing the knife blade edge located just after forward movement of the blade has started a cutting operation;

FIG. 2 is a view similar to FIG. 1 illustrating the knife blade edge at the completion of a cutting operation;

FIG. 3 is a plan view of the apparatus shown in FIG. 1 with parts broken away and in section, the knife blade being positioned as in FIG. 1;

FIG. 4 is a view similar to FIG. 3 but showing the knife blade positioned as in FIG. 2;

FIG. 5 is a section looking in the direction of the arrows 5—5, in FIG. 2;

FIG. 6 is an enlarged fragmentary view illustrating the curled chip slicing operation;

FIG. 7 is a diagrammatic view illustrating relative positions of certain of the knife blade and hopper parts;

FIG. 8 is a somewhat diagrammatic perspective view of the apparatus illustrated in FIG. 1; and FIG. 9 is a view similar to FIG. 8 but showing the hinged feed hopper member moved out of normal position to expose the knife blade and hopper parts accessibly for cleaning.

Similar numerals refer to similar parts throughout the various figures of the drawings.

The new frozen meat chipping apparatus is generally indicated at 1 and includes a support frame generally indicated at 2 which is generally rectangular and is formed by front and rear cross members 3 and 4 and longitudinal side members 5 and 6. An intermediate cross brace and motor mounting plate 7 is connected between side members 5 and 6 and extends upward from support frame 2. Frame 2 is open at its top and bottom and preferably is mounted on suitable legs indicated at 8 to position it on the floor or work counter of a meat market.

A pair of slide rods 9 and 10 is mounted on frame 2 extending parallel with and close to side members 5 and 6, respectively. One end of each rod 9 and 10 is supported at 11 by cross plate 7 and secured thereto by snap ring 12; and the other end of each rod 9 and 10 is supported on front frame member 3 and connected to frame 2 by nuts 13.

A knife plate 14 is slidably mounted by slide guide bosses 15 for reciprocating movement on slide rods 9 and 10. Knife plate 14 has a top surface 16 and a bottom surface 17 and is formed with an angular chip slot 18 dividing plate 14 into front section 19 and rear section 20.

A slide drive pivot pin 21 is mounted on U-shaped ears 22 projecting downward centrally of the rear end of rear section 20 of knife plate 14. Pitman rod 23 is connected at one end to pivot pin 21 and its other end is pivoted to crank pin 24 on counterweighted crank plate 25. Crank plate 25 is connected at 26 to one end of drive shaft 27 mounted in bearing 28 carried by support frame 2, and the other end of drive shaft 27 is provided with a drive sprocket 29 driven by chain 30 which is trained over motor sprocket 31 of drive motor 32 mounted on the rear of mounting plate 7.

Operation of the motor 32 and chain drive 29, 30, and 31 rotates crank plate 25 so that crank pin 24 through pitman rod 23 connected to knife plate 14 reciprocates knife plate 14 back and forth along slide rods 9 and 10. Crank plate 25, as shown, preferably includes a counterweighted portion 33.

The motor 32 and other drive elements located to the right of mounting plate 7 (FIG. 1) preferably is enclosed by a cover indicated at 34. It is understood that mounting plate 7 is suitably notched at 7a centrally of its lower edge to permit typical movements of pitman rod 23 during operation of drive motor 32.

In general, the limits of movement of knife plate 14 are shown in FIGS. 1, 2, 3 and 4. In FIGS. 1 and 3, knife plate 14 has just started forward movement from its rearmost position toward the front cross member 3 of support frame 2. In FIGS. 2 and 4, knife plate 14 has just completed forward movement and has just started return movement away from front cross member 3 of support frame 2.

Chip slot 18, as shown, extends laterally of knife plate 14 at an acute angle, slightly less than 90°, with respect to the direction of plate travel on slide rods 9 and 10, the leading end of chip slot 18 being indicated at 35 in the drawings. Chip slot 18 in addition to being angular in lateral extent also has at least one slot surface or knife plate edge 36 that is beveled or extends at an angle downwardly rearwardly between top surface 16 and bottom surface 17 of plate 14. The other plate edge 37 which forms chip slot 18 may have any desired arrangement such as the vertical arrangement indicated.

A knife blade 38 is removably mounted by screws 39 on the blade receiving top surface 16 of rear section 20 of knife blade 14. Blade 38 has a knife edge 40 located in the upper surface of blade 38 and located over and aligned with chip slot 18. Knife edge 40 is formed by beveling the angular leading edge of blade 38 at 41, as best shown in FIGS. 6 and 7, at an angle different from the downward rearward angle of beveled slot surface 36. For example, surface 36 may extend at an angle of 45° to the horizontal while beveled edge 41 of blade 38 preferably extends at an angle of from 30° to 35° to the horizontal. Furthermore, beveled blade edge 41 preferably is offset slightly forwardly of beveled slot surface 36, as indicated at 42, for a purpose to be described.

Knife edge 40 thus is spaced above top surface 16 of front section 19 of knife plate 14 a predetermined distance, determined by the thickness of blade 38. Although the improved chipping apparatus normally has a blade 38 having a thickness of say 0.172", the apparatus may be supplied with blades having different thicknesses for use under different conditions and for various purposes, such as thicknesses ranging between 0.150" to 0.200" thick.

The chipping apparatus is provided with a feed hopper generally indicated at 43 which, in accordance with the invention, has a particular location and arrangement with respect to knife plate 14 and angular chip slot 18 therein. A plate 44 is mounted on frame 2 and is supported at its upper end 45 by mounting plate 7. Plate 44 extends laterally crosswise of frame 2 with its lower end 46 supported on frame side members 5 and 6 at a zone spaced from mounting plate 7 to locate plate 44 in a slanting position.

A cover member 47 is hinged at one side edge 48 by hinge means 49 to the side member 6 of support frame 2. Cover member 47 when in the normal position of FIGS. 1, 2, 3, and 4 covers that portion of the open top of support frame 2 along which the front section 19 of knife plate 14 reciprocates. Cover member 47 has rearwardly extending leg portions 50 and cover member 47 and leg portions 50 define a hopper opening indicated at 51. Hopper walls 52, 53, and 54, U-shaped in cross section, extend upwardly rearwardly in a slanting position from the hopper opening 51, the opposite walls 52 and 54 preferably being perpendicular to plate 44, and hopper wall 53 being parallel with slanting plate 44 when the cover member 47 is in normal position illustrated in FIGS. 1 and 2.

Hopper feed opening 51 is located adjacent the path of travel of the knife edge 40 during reciprocation of the knife blade 38, and as shown, feed opening 51 is generally rectangular in shape and has a lateral dimension between hopper walls 52 and 54 approximately the lateral length of chip slot 18.

The width of opening 51, in the direction of knife plate travel from the rear of cover 47 to the lower end 46 of plate 44, the latter of which defines the rear side of rectangular feed opening 51, is less than the distance transversed by knife edge 40 during reciprocation of plate 14.

Thus, the U-shaped hopper forming walls 52, 53, and 54 on the hinged cover member 47, together with plate 44, defines the walls of feed hopper or meat block chute 43 extending upwardly rearwardly from cover member 47 and from feed opening 51 formed therein.

Cover member 47 when in the normal position illustrated in FIGS. 1 and 2 rests on the top of support frame 2 so that the undersurface of cover member 47 is spaced above the path of travel of knife edge 40. As shown in FIG. 7, this clearance space 55 may be say 0.140" when the blade thickness 56 is 0.172", the importance of clearance space 55 being described hereinbelow.

Cover member 47 and hopper walls 52, 53, 54 carried thereby may be moved on hinges 49 to a position such as illustrated in FIG. 9 to uncover the open top of the front end of support frame 2 and the reciprocating knife plate 14 so that these parts are accessible for cleaning. In the open position described and illustrated, the face of hopper plate 44 also is accessible for cleaning as well as the inside surfaces of U-shaped walls 52, 53, and 54. A lid 57 hinged at 58 to the upper end of hopper wall 53 preferably is provided for closing the upper end of the slanted feed hopper. A control or interlock switch 59 preferably is mounted on mounting plate 7 adjacent the upper end of the latter, having switch trigger 60 adapted to be engaged by an adjustable switch actuator 61 mounted on lid 57.

Switch 59 is connected in the power circuit to motor 32 and is arranged to that switch 59 interrupts power to the motor at all times except when trigger 60 is engaged by actuator 61. Thus, lid 57 must be closed before knife plate 14 can be reciprocated by the motor, and thereby safety in the use of the apparatus is maintained. Obviously, when main cover member 47 is swung to open position for cleaning the equipment, switch actuator 61 is disengaged from switch trigger 60 to prevent operation of motor 32.

Cover member 47 may be provided with a latch 62 engaged with support frame 2 for latching the cover member in normal closed position, as shown. Since the feed hopper 43 is substantially rectangular in cross section, frozen blocks of meat of various sizes may be inserted therein, ranging in weight from say 40 to 60 pounds which is typical of beef in frozen block condition distributed to meat markets. A typical block is illustrated generally at 63 in the drawings, located in feed hopper 43 in FIG. 1 prior to being chipped.

The apparatus may be used for converting meat from frozen block to ground condition by opening lid 57 with cover member 47 latched at 62 to support frame 2, and by then introducing a frozen block of meat into feed hopper 43, as indicated in FIG. 1. Lid 57 then is closed, actuating switch 59 so that motor 32 may be energized to reciprocate knife plate 14 back and forth between the positions shown in FIGS. 1 and 2. During such reciprocation, knife blade 38 shaves, slices, or chips slices of frozen material from block 63 to form chips indicated at 64 which may be collected in a suitable receptacle 65 located generally beneath hopper opening 51 (FIG. 6).

The angularity of the beveled edge 41 of knife blade 38 forming knife edge 40 curls the chips 64 of frozen material which are cut or shaved from block 63, as indicated in FIG. 6. Furthermore, the offset 42 of beveled blade edge 41 from the beveled slot surface 36 prevents the cut frozen chips 64 from tending to force between blade 38 and rear section 20 of knife plate 14, which if it occurred could damage the equipment.

The angularity of chip slot 18 and knife edge 40 at an acute angle laterally of knife plate 14 slightly less than 90° with respect to the direction of plate travel causes the portion of the knife edge above the leading end 35 of chip slot 18 first to engage and cut into the corner of the frozen block 63 nearest to the viewer of FIG. 1 as knife plate 14 moves from right to left. Thus, with each stroke of the knife plate, a slice in effect, is cut from the bottom portion of block 63; and the cutting of each slice proceeds laterally across the bottom of the block at an angle to the block surface into which the blade enters for shaving, slicing, or chipping the meat in frozen condition to form the frozen chips 64.

The angular, beveled and slanted relationships of the various elements as to their location and relative arrangement results in knife blade 38 tending to pull block 63 downward in feed hopper 43 with each cut; rather than to tend to force the block 63 upward in the feed hopper as has been the case in prior chopping mechanisms not involving the coordination of elements characterizing the present invention. Furthermore, the lateral angularity of chip slot 18 and knife edge 40 with respect to hinges 49 for cover member 47 tends to force cover member 47 toward normal or closed position illustrated in FIG. 1 during each cut, rather than tending to open hinged cover member 47.

Although knife plate 14 and its slide mounting on slide rods 8 and 9 are designed to provide all possible rigidity to knife plate 14 during its movement in a fixed path while slicing or chipping frozen material, nevertheless some spring in knife plate 14 cannot be prevented when the rigid knife blade 38 fixed to knife plate 14 bites into the block 63 of frozen material. This spring can result in the knife edge 40 raising slightly during cutting. Clearance 55 previously described and illustrated in FIG. 7 is provided and maintained so that knife blade 38 will not contact cover member 47 if plate 14 or rods 9 and 10 spring slightly upward.

An important concept of the invention is that no shearing action takes place as is the case when two knife or scissors blades coact to cut or shear material between such blades. The operation of the improved apparatus results in a shaving action of slices of predetermined thickness which enables curled chips 64 of frozen material to be produced.

The curled frozen chips collected in receptacle 65 then may be fed in frozen condition immediately to a usual meat grinder and ground therein to ground meat form such as hamburger, the ground meat meanwhile retaining its bloom because of not being thawed before grinding.

The equipment in use slantingly positions a frozen block of meat introduced into the feed hopper so that the block slides downwardly by gravity to rest angularly against the reciprocable knife plate. The angularly extending knife when reciprocated thus cooperatively wedge-engages the blade and block to force the block downward in the hopper against the plate and to hold the blade edge engaged with the block during cutting movement of the knife plate.

Knife blade 38 is indicated as preferably having a thickness of 0.172", or within the range of 0.150" to 0.200" thick. This range, however, may be somewhat larger, such as from 0.125" to 0.250" thick. Increasing the knife blade thickness increases the thickness of the cut or slice of frozen material shaved, chipped, or sliced from the frozen block of meat. As the slice thickness increases, power requirements for the drive mechanism also increase.

On the other hand, if knife blade 38 is too thin, that is thinner than the smallest thickness in the indicated ranges, then knife edge 40 of blade 38 in starting a chipping cut may not bite or cut into the block sufficiently to maintain shaving or chipping action. This insufficient cutting engagement is accompanied by an upward popping movement of the block, disengaging the block from the chipping or slicing action of knife blade 38.

Thus, the practical limits for proper, economic, and efficient operation of the improved apparatus are as set forth with respect to knife blade thickness and the resulting predetermined thickness of the slices cut which form the curled chips 64. Furthermore, chips 64 formed from slices of frozen material cut by a knife blade having a thickness in the range indicated are not too thick to be readily ground in usual meat grinders to form hamburger without damage to the meat grinding equipment.

The angularity of beveled edge 41 of knife blade 38 preferably, as indicated, is different than the angularity of beveled slot surface 36. Also, as indicated, the beveled surfaces are offset, in accordance with the invention. These relationships assure the formation of curled chips of frozen material and at the same time assure that the chip cutting operation will not damage the knife blade 38 and the knife plate 14 on which the blade is mounted. A small angle, within limits, for the beveled blade edge 41 is desirable for reducing resistance to knife cutting entry of knife edge 40 into the frozen material.

One of the other important considerations of the inventive concept involves the lateral angularity of knife edge 40 and chip slot 18. This angularity has been described as being slightly less than 90° with respect to the direction of plate travel and this angle is represented by the curved arrow 66 in FIG. 4. From the standpoint of ease of cutting frozen chips 64 progressively from one side to the other of a block 63 with each cutting stroke of knife plate 14, the smaller that angle 66 is, the better. However, as angle 66 is reduced further and further below 90°, the stroke of knife plate 14 must be increased. This means greater travel for the reciprocating mechanism and a greater throw for crank member 25.

This in turn involves larger and stronger parts for the drive mechanism, and greater stress on the equipment. Thus, the angularity of knife edge 40, at an acute angle approaching but less than 90° with respect to the direction of plate travel, is a compromise between a more acute angle for enhanced cutting properties, and a less acute angle for minimum size, weight and cost of equipment. The important point is that the knife edge 40 should not extend at 90° with respect to the direction of plate travel since this would involve instantaneous engagement of the knife edge throughout its length at the start of any cut of frozen material which would impose extreme and undesirable stress upon the equipment.

Accordingly, the present invention provides improved frozen meat block chipping apparatus and frozen meat-handling procedures which are simple and practical in use; which are easy to operate and maintain in a sanitary condition; which may be operated safely without equipment damage or likelihod of operator injury in converting frozen meat to ground condition; which enable meat in frozen form to be converted to ground condition without meat loss, in a minimum of time and without loss of bloom or decrease of case life; which solve problems that have existed in the art; which avoid difficulties previously encountered; and which achieve the stated objects, accomplish the many new functions and results described, and generally satisfy needs that have existed in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structural details shown because the sizes of various parts and components may be varied to provide other structural embodiments without departing from the fundamental principles of the invention.

Having now described the features, discoveries and principles of the invention, the construction, operation and use of a preferred form thereof, the preferred steps in the improved method or procedure, and the advantageous, new and useful results obtained thereby; the new and useful discoveries, principles, apparatus, combinations, parts, elements, arrangements, relationships, constructions, methods, steps, procedures and mechanical equivalents obvious to those skilled in the art are set forth in the appended claims.

I claim:

1. In meat chipping apparatus, a support frame, a rigid knife plate mounted for horizontal reciprocating movement on the frame, a rigid knife blade fixedly mounted on the plate having a beveled edge forming a knife edge, the knife blade having a thickness of from 0.125" to 0.250" thick, the knife edge being spaced from the knife plate a distance equal to the knife blade thickness, means for reciprocating the plate including a motor, frozen meat block hopper means mounted on the frame extending upwardly rearwardly at an acute angle with respect to the direction of cutting movement of the plate, the plate being formed with a chip slot aligned with and spaced below the knife edge, the chip slot having a slot surface beveled at an angle different from the angle of the knife blade beveled edge, the knife blade beveled edge and chip slot beveled surface being offset with respect to one another, the hopper means being formed with a rectangular feed opening having front and rear edges extending laterally above and spaced from the plane of the knife edge at an angle of 90° with respect to the direction of plate movement, the hopper means including a plurality of hopper forming frozen meat block contacting walls extending upwardly from the rectangular feed opening, at least one of the hopper forming walls being fixed to the frame, the remaining hopper walls being hingedly mounted on the frame, the knife edge moving across the space between and beyond the front and rear hopper opening edges during reciprocating plate movement, the aligned chip slot and knife edge extending laterally at an angle of less than 90° with respect to the direction of plate movement, the hopper forming walls having upper ends defining an upper hopper opening, closure means for the upper hopper opening, and interlocking means connected between the motor and closure means constructed to permit motor operation when the closure means is closed and to prevent motor operation whenever the closure means is open.

2. In meat chipping apparatus, a support frame open at its top and bottom, slide means mounted on the frame, a rigid knife plate having top and bottom surfaces slidably mounted for horizontal reciprocating movement on the slide means, drive means including a motor and drive elements mounted on the frame and connected with the plate for reciprocating the plate on the slide means, the knife plate being formed with a chip slot extending in the plate laterally at an acute angle slightly less than 90° to the direction of plate travel during reciprocation and dividing the plate into front and rear sections, said angularly extending chip slot in part at least also extending at an angle downwardly rearwardly between the top and bottom plate surfaces, rigid knife blade means removably mounted on the rear plate section having a knife edge located above and aligned with the chip slot and formed by a blade edge beveled at an angle different from the downward rearward slot angle, the knife edge being spaced above the top surface of the front plate section a distance equal to the thickness of the blade means, frozen meat block hopper means mounted on the frame formed with a feed opening adjacent the path of travel of the knife edge during knife plate reciprocation, the feed opening being generally rectangular in shape having front and rear edges extending laterally above and spaced from the plane of the knife edge at an angle to the direction of plate movement, the knife edge moving across the space between and beyond the front and rear hopper opening edges during reciprocating plate movement, the feed hopper means including a member hinge mounted on the support frame, the hinged member having a front cover portion normally positioned to cover that portion of the open top of the support frame along which the front section of the knife plate reciprocates; the front cover portion also being normally positioned at a location spaced above the knife plate and blade means, the hinged member also having U-shaped hopper forming walls extending upwardly rearwardly from the cover portion, the lower ends of the U-shaped walls defining three sides of the feed opening, the feed hopper means also including an upwardly rearwardly disposed hopper wall plate mounted on the support frame the lower end of which defines the fourth side of the feed opening, the U-shaped walls when the hinged member is in normal position being located cooperatively with the hopper plate to form a slanted frozen block-receiving hopper rectangular in cross section extending upwardly rearwardly from said feed opening, the hinged member when swung on its hinged mounting out of normal position exposing the block contacting hopper surfaces and the slide plate and knife blade accessibly for cleaning, the hopper forming walls and plate terminating in an upper open hopper end, a switch mounted adjacent said open hopper end, cover means for said open hopper end, the cover means engaging said switch when the cover means is in closed position on the upper open hopper end, and the switch being connected in circuit with the motor to permit the motor to be energized only when the hopper cover means is in closed position.

3. In meat chipping apparatus, a support frame open at its top and bottom, rigid knife plate means mounted for horizontal reciprocating movement on the frame, the plate means having a knife blade receiving surface, a rigid knife blade from 0.125" to 0.250" thick mounted in fixed position on said blade receiving surface, the blade having a beveled edge forming a knife edge, the fixed blade knife edge being spaced above the blade receiving surface of said plate a distance at least equal to the knife blade thickness, means for reciprocating the plate; frozen meat block hopper means including a member hinge-mounted on the support frame forming a cover normally positioned over that portion of the open top of the support frame wherein the plate reciprocates, and a plurality of hopper walls mounted on the hinged member forming a meat block chute extending upwardly rearwardly at an acute angle with respect to the direction of cutting movement of the plate; the knife plate being formed with a beveled edge aligned with the knife edge, the beveled plate edge being beveled at an angle different from the angle of the knife blade beveled edge, the beveled plate edge being offset from the knife blade beveled edge, the hopper means chute forming walls forming a rectangular feed opening having front and rear edges extending laterally above and spaced from the plane of the knife edge at an angle of 90° with respect to the direction of plate movement, the knife edge moving across the space between and beyond the front and rear hopper opening edges during reciprocating movement of the plate, the aligned beveled plate and knife blade edges extending laterally at an angle less than 90° with respect to the direction of plate movement; whereby the angularly extending knife blade cooperatively with the upwardly rearwardly angled chute wedge-engage the knife blade and a meat block in the chute to force the block downward in the chute against the knife blade and to hold the blade edge engaged with the block during cutting movement of the knife blade across the space between and beyond the front and rear hopper opening edges when the plate is reciprocated; and the hinged member when swung on its hinge mounting out of normal position exposing the knife plate and knife blade accessibly for cleaning.

References Cited

UNITED STATES PATENTS

| | | | |
|---|---|---|---|
| 224,016 | 2/1880 | Hornung | 146—151 |
| 492,967 | 3/1893 | Patten | 146—151 |
| 1,876,471 | 9/1932 | Sander | 146—182.1 |
| 2,963,062 | 12/1960 | Hughes | 146—123 |

FOREIGN PATENTS

| | | |
|---|---|---|
| 357,315 | 5/1931 | Great Britain. |

DONALD R. SCHRAN, *Primary Examiner.*